July 4, 1961 J. L. HILL 2,991,460

DATA HANDLING AND CONVERSION

Filed Aug. 19, 1954 6 Sheets-Sheet 1

INVENTOR
JOHN L. HILL

BY Cushman, Darby & Cushman
ATTORNEYS

July 4, 1961 J. L. HILL 2,991,460

DATA HANDLING AND CONVERSION

Filed Aug. 19, 1954 6 Sheets-Sheet 2

INVENTOR
JOHN L. HILL

BY Cushman, Darby & Cushman

ATTORNEYS

INVENTOR
JOHN L. HILL
BY Cushman, Darby & Cushman
ATTORNEYS

July 4, 1961 J. L. HILL 2,991,460

DATA HANDLING AND CONVERSION

Filed Aug. 19, 1954 6 Sheets-Sheet 4

INVENTOR

JOHN L. HILL

BY Cushman, Darby & Cushman

ATTORNEYS

INVENTOR
JOHN L. HILL
BY Cushman, Darby & Cushman
ATTORNEYS

July 4, 1961 J. L. HILL 2,991,460

DATA HANDLING AND CONVERSION

Filed Aug. 19, 1954 6 Sheets-Sheet 6

INVENTOR
JOHN L. HILL

BY Cushman, Darby & Cushman

ATTORNEYS

United States Patent Office 2,991,460
Patented July 4, 1961

2,991,460
DATA HANDLING AND CONVERSION

John L. Hill, North St. Paul, Minn., assignor, by mesne assignments, to Sperry Rand Corporation, a corporation of Delaware Filed Aug. 19, 1954, Ser. No. 451,030
12 Claims. (Cl. 340—347)

This invention is concerned with data handling and pertains in part to methods and apparatus for converting numbers and in part to apparatus for compactly storing and locating tabular data or the like on the surface of a record member which rotates or is movable in cycles of travel such as a drum, disc or endless belt. The invention is highly useful in magnetic recording and for convenience and clarity in providing illustrative examples the following explanation will proceed with regard thereto.

In United States Patent No. 2,540,654 issued February 6, 1951, to A. A. Cohen et al., there is described apparatus for recording magnetic spots or cells on the surface of an elongated magnetizable member which is adapted to be moved continuously in relation to various magnetic transducing heads. In a specific embodiment therein disclosed, the magnetizable member is in the form of magnetic tape wrapped tightly about the periphery of a rotatable drum, which is accordingly termed a magnetic drum. The unit of storage is a short length of the tape forming a magnetized dipole having either of two polarity orientations in a lateral direction and is thus binary in nature, the unit of storage being one binary digit or "bit." The transducing mechanism for both reading and writing is a so-called magnetic head. When used for writing, the magnetic head produces a fringing flux of sufficient magnitude to form magnetized dipoles in the drum surface and, when used for reading, receives from these dipoles a changing flux which by its form identifies the value of the stored bit. Individual entries in storage are identified by specifying the coordinates of one or more bits on the drum surface in terms of angular and axial positions, the combination of which is called the address. The angular position may be determined by various methods, such as by reference to a fiducial mark on the drum by counting clock or timing pulses generated from a timing track as the drum rotates. Axial positions are obtained by selection of the appropriate magnetic head, at least one head sweeping out a track around the drum.

The present invention also deals with means for tabulating data, each item of which is identified by a unique set of characters. While separately useful, the description will be in connection with its application to the problem of address location on a magnetic drum or other elongated record medium. This invention is primarily applicable to tallying operations such as are encountered in the keeping of inventories or open accounts. For instance, it is customary in the merchandising field to use decimal numbers to identify catalog or stockroom items. These number are seldom consecutive, because it is desirable to reserve blocks of numbers to indicate a particular characteristic of the items and sub-blocks to indicate other features. When the magnetic drum or the like is used to tally the inventory, the non-consecutive numbering system is frequently wasteful of storage space.

It is an object of this invention to provide a system for modifying a non-consecutive number set in such a manner that it appears as an essentially consecutive set of numbers.

It is a further object of this invention to provide a flexible system for compactly tallying tabular data on a cyclically moving record member having an inherent continuous location-identifying characteristic while retaining a non-consecutive numbering system externally.

It is a further object of this invention to provide equipment for translating a non-consecutive set of unit record identifying numbers into a consecutive number set which incidentally also performs a large fraction of the address locating operation attendant to using a magnetic drum surface or like record as a storage medium for the associated unit item records.

It is a further object of this invention to provide an improved apparatus for location of data on a record member in response to track and track section input information.

Further objects and advantages of this invention will be in part expressed and in part obvious from the following description and claims and in the accompanying drawings, in which:

Figure 1:
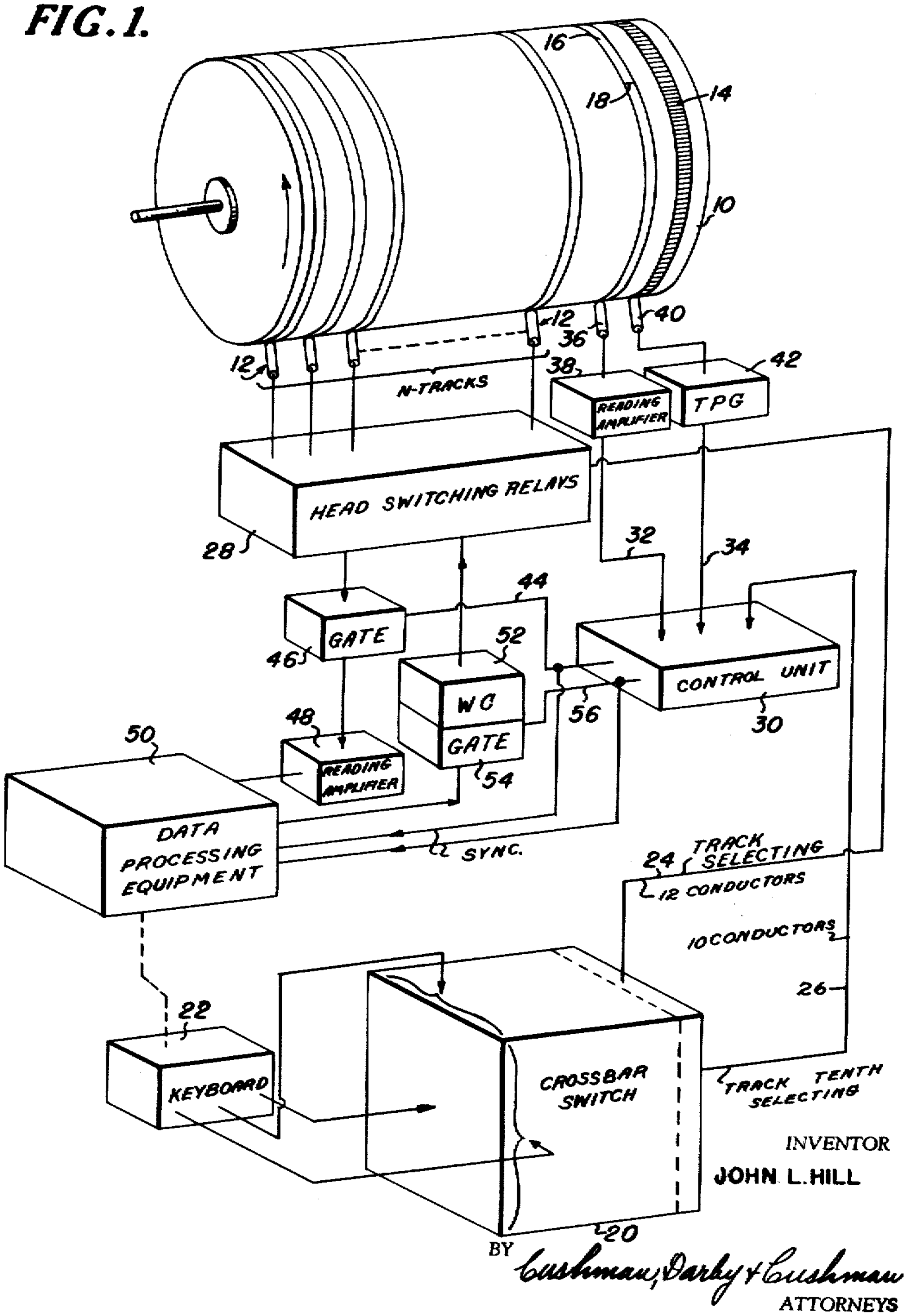
FIGURE 1 is a three-dimensional diagrammatic drawing of a first embodiment of this invention whereby a non-consecutive, three-digit decimal number set is modified to appear as a consecutive set of location identifying expressions.

FIGURE 1 illustrates an overall system including means by which a series of non-consecutive three-digit numbers are modified to form a consecutive series of three-digit numbers, and also means for using the consecutive numbers to locate areas on a drum for transducing operations. While three digits would rarely suffice for a catalog or set of accounts of a size requiring mechanized tallying, the system of FIGURE 1 embodies the basic concepts of this invention and should enable the reader to grasp more readily the principles thereof.

The numeral 10 in FIGURE 1 designates a magnetic drum, with N information or data tracks on which data may be tallied by means of a like number of transducers 12. The drum is also provided with a timing track 14 and a mark track 16 which contains a single, permanently-recorded fiducial mark 18.

For purposes of example, suppose that a tally is to be made of a maximum of 120 five-digit decimal numbers, each of which is identified by a three-digit catalog number. Suppose further that the tally be made on twelve tracks of a drum at ten items per track. Each of the five-digit numbers is expressed in binary code requiring 4 bits per digit or 20 bits per item so that each track need contain only 200 cells. This, of course, would be an unusually small storage capacity, but it should be understood that this example is being used only for purposes of explanation and that a practical system would have far greater capacity.

As indicated previously, the information or data on each of the N tracks comprises, for each item of information, several binary digital notations (bits) for each of the individual units composing an item. The supposition that ten such items are recorded on each track has been made, and, as will become more apparent hereinafter, these items are interlaced with each other. That is, a drum track is not, in this first example, divided into ten sectors with an item per sector, but instead, is divided in effect into the number of sections equal to the number of bits per item, which in this example would be 20 sections. Each section then contains one bit of each of the 10 items (e.g., all the fist bits in the first section, all the second bits in the second section, etc.). It is apparent then that successive bits pertaining to any one particular item are spaced ten bits apart since the interlacing of all the bits in all the items on a track is in a consecutive-by-tens fashion. Therefore, in relation to this first example, it will be understood that the reference hereinafter to a "track-tenth" or a "tenth part of a track" means the small separated areas circumferentially around a track which when combined form a complete item of information and would, if made contiguous, constitute one-tenth section of a full track.

The two highest order digits of the catalog number are used to identify the track and the units digit selects the tenth part of that track. Because of the random nature of the catalog numbers, the first two digits also modify the value of the third to preclude the existence of duplicate values to identify the tenth parts of any one track on the drum. This modification is performed through suitable switching means and an arbitrarily wired terminal board. A preferred switching means is a crossbar switch 20, well known in the automatic telephone art, comprising two sets of 10 coils and 100 sets of at least 11 contacts. A contact set is closed only when both of the coils controlling it are energized. Ten of the contacts in each set are used in the track-tenth selecting operation, and the eleventh is reserved for track selection. The operation of the crossbar switch bar switch 20 will be described below in detail in connection with FIGURE 2.

Referring again to FIGURE 1, the entry on keyboard 22 of a three-digit catalog number produces, when applied to crossbar 20, outputs on one of twelve track selecting output lines 24 and on one of ten track-tenth selecting output lines 26. The energy on one of lines 24 closes one of twelve head switching relays 28 which select the track from which data may be read and on which data may be recorded. Simultaneously, the energy on one of the track-tenth lines 26 is applied to control unit 30, which restricts the reading and writing operations to one tenth of the drum period by means of reference pulses arriving on line 32 and timing pulses on line 34. The reference pulses are obtained from fiducial mark 18 by means of reading transducer 36 and reading amplifier 38. Timing pulses are produced from timing track 14 by transducer 40 and timing pulse generator 42 in any one of a number of well known ways such as is described in Cohen Patent 2,540,654, issued February 6, 1951. In a tally operation, control unit 30 emits a burst of reading control pulses on line 44 which pass through gate 46 when that gate is enable by the reading of a "1" by the transducing head selected by head switching relays 28. Pulses emitted from gate 46 are transmitted through reading amplifier 48 to the data processing equipment 50 which modifies the information according to the pre-established rules for the entry being processed. For example, assuming the drum to contain an inventory concerning automobile parts and assuming the processing operation is to subtract from this inventory value the number of pistons of a certain type which have been recently sold, then while the recorded inventory balance is temporarily held in the processing equipment 50, the number on hand could be changed by the number recently withdrawn from (or if bought, added to) the stock. The modified inventory balance is then issued on the line connecting data processing equipment 50 to gate 54, and is rewritten on the drum 10 via writing circuit 52 and the head switching relays 28. The internal character of the data processing equipment 50 is entirely unrelated to the subject of this invention except that it must be capable of presenting the processed result as a series of "ones" and "zeroes." Voltages representing this information are applied to gate 54 in synchronism with a burst of writing control pulses arriving on line 56 from control unit 30. Writing circuit 52 and gate 54 are shown joined together, inasmuch as they may be combined into a single unit as will be shown in FIGURE 4.

The operation of the embodiment of this invention illustrated in FIGURE 1 will now be described in greater detail. In so doing, let us consider in particular the handling of the first ten items of a catalog in which each item is identified by a three-digit decimal number. Addresses may be assigned on the drum as follows:

| Catalog number: | Drum address |
|---|---|
| 101 | 01–0 |
| 102 | 01–1 |
| 105 | 01–2 |
| 106 | 01–3 |
| 107 | 01–4 |
| 116 | 01–5 |
| 112 | 01–6 |
| 103 | 01–7 |
| Not used | 01–8 |
| Not used | 01–9 |
| 127 | 02–0 |
| 129 | 02–1 |

where the first two digits of the address indicate one of 12 tracks and the units digit indicates the track tenth. In this example, it is apparent that no quality of one or more digits of the catalog number bears a simple relationship to the number identifying the tenth of the track to which it is assigned. However, the two highest order digits of the catalog number can be used by themselves to identify one of the 12 tracks. In this case, catalog numbers 10X and 11X (where X is any decimal digit) identify the first track and 12X identify the second. Two of the track tenths are not used for convenience in adding other catalog numbers in the range from 100 to 119, should it later become necessary to do so. For instance, catalog number 100 might be assigned to drum address 01–8, and there is nothing to prevent the use of the two vacancies as addresses for catalog numbers in an entirely different range, e.g., 78X, so long as 78X is not used to indicate some other track.

Figure 2:
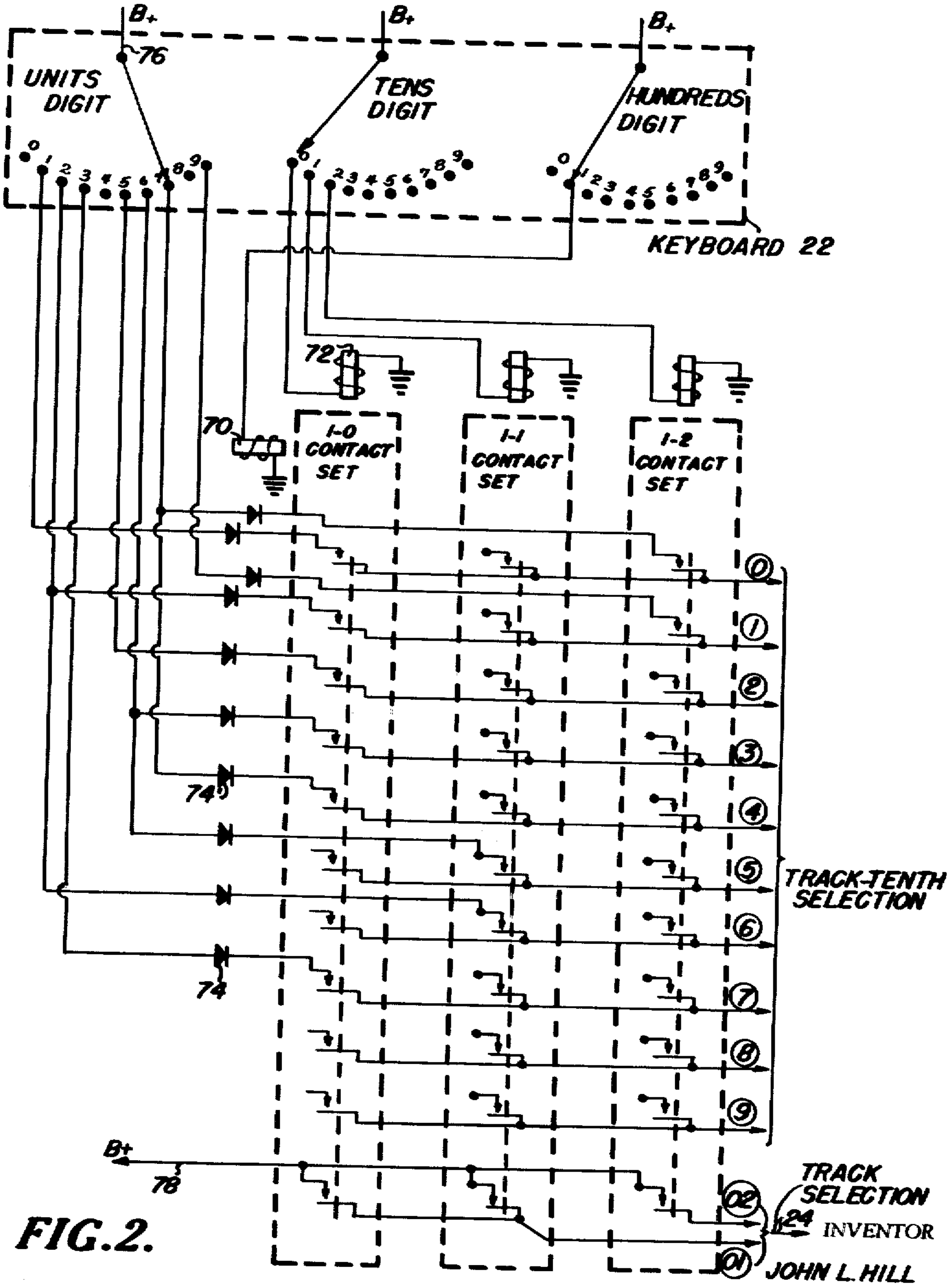
FIGURE 2 illustrates the preferred switching means employed in the embodiment illustrated in FIGURE 1.

FIGURE 2 illustrates preferred switching means for catalog number modification consisting of two sets of 10 coils and 100 sets of 11 contacts (the crossbar switch 20 of FIGURE 1). When one coil in each of the two sets of 10 coils is energized, one set of 11 contacts is closed. Three contact sets are shown in FIGURE 2, the three required to transform the exemplary catalog numbers set forth above. By setting the keyboard 22 as shown in FIGURE 2 to catalog number 107, the "1" contact of the hundreds key energizes solenoid coil 70 to move a driving interposer for contact sets 1–0, 1–1, 1–2, etc., into position so that coil 72, which is energized from the "0" contact of the tens key, causes only the contacts in set 1–0 to close. This closes the circuit formed by the units key of keyboard 22 and one of the contacts of the 1–0 set and the isolating diode 74' to allow the positive potential on line 76 to appear on the one of track-tenth selector lines 26 indicated by the encircled number 4. It also applies the positive potential on line 78 to the output lead indicated by encircled number 01 to select a track via lines 24. It will be appreciated that solenoid coil 72 would energize contact sets 2–0, 3–0, etc., except that only the driving interposer in set 1–0 is in position to cause closure. Because the recurrent use of relay contacts in this random manner inevitably results in a large number of "sneak" circuits, simple rectifier elements (valve action) are included and are generally indicated by reference character 74.

Crossbar switches as they are known in the telephone art may be understood in greater detail by reference to Patent 2,577,067, R. P. Arthur, Dec. 4, 1951, as one example. Further descriptive matter serving to provide a simplified explanation of these switches appears at pages 60–64 of a reprint from the Bell Laboratories Record, Vol. XVII, "The Crossbar Switch" by J. N. Reynolds.

Figure 3:
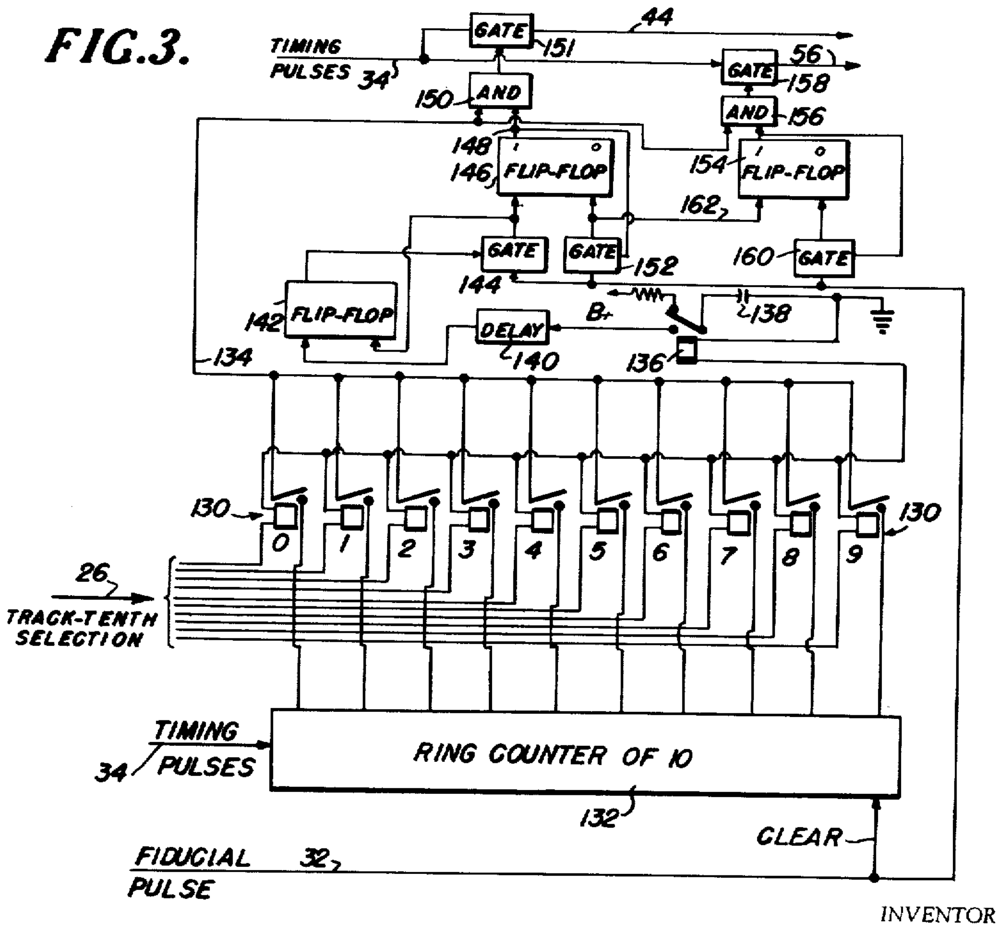
FIGURE 3 shows the control unit used in FIGURE 1.

An output on one of track-tenth selecting lines 26 sets one of 10 relays, indicated generally as 130 in FIGURE 3, to which reference now is made for purposes of explaining the method employed for locating angular positions around the magnetic drum 10. With each revolution of the drum, a pulse from fiducial mark 18 appears on lead 32 and 200 timing pulses (one for each cell in track 14, in keeping with the example previously set forth) arrive on lead 34. Each fiducial pulse clears ring counter 132 which is then cyclically and continuously stepped by the timing pulses to produce an enable voltage on each of its ten outputs in turn at least 20 times before again being cleared by the fiducial pulse. The closed one of relays 130 passes a positive voltage pulse having a duration of the timing pulse interval each time ring counter 132 is stepped to that position so that every tenth timing pulse produces an "enable" voltage on line 134.

The closing of one of relays 130 also causes relay 136 to close so that capacitor 138 is discharged through delay element 140. Delay 140 is included in the control unit to insure that the selected one of relays 130 is securely closed before further steps are taken. The pulse from capacitor 138 sets flip-flop 142 to enable gate 144 to pass the next fiducial pulse which both resets flip-flop 142 and sets flip-flop 146, producing an enable voltage on line 148. When enable voltages on lines 134 and 148 are simultaneously applied to "logical and" circuit 150, gate 151 is enabled to pass timing pulses. Since an enable is present on line 134 for every tenth timing pulse, a burst of 20 reading control pulses (i.e., one pulse every tenth timing pulse) is emitted on line 44 during one drum revolution to allow the information in 20 cells (i.e., every tenth cell) on the selected track of the drum to be gated by gate 46 to the data processing equipment 50 as shown in FIGURE 1. The selection of only one of the ten output lines from counter 132 by a relay in the 130 group therefore not only identifies one of ten interlaced items in the connected track and also results in a reduction in bit frequency by a factor of 10, which may be termed a 1 to 10 interlace. The voltage on line 148 also enables gate 152 so that the next fiducial pulse resets and sets flip-flops 146 and 154, respectively. Now "and" circuit 156 can enable gate 158 whenever a voltage is present on line 134 to allow a burst of 20 writing control pulses (i.e., one pulse every tenth timing pulse) to gate the modified (or original) information in the data processing equipment 50 to the drum in the same interlaced fashion. The output from flip-flop 154 also allows the next fiducial pulse to pass gate 160 to reset flip-flop 154 so that the burst of writing control pulses on line 56 continues only during a single drum revolution. It is frequently convenient to mix the pulses on lines 44 and 56 and use the combined output to synchronize the operation of the data processing equipment 50. The control unit 30 is now disabled and the control mechanism awaits a new entry on keyboard 22.

The design for the control unit as illustrated in FIGURE 3 is based on the assumption that the data processing equipment is capable of receiving the old record during one drum revolution and simultaneously modifying it by the new information so as to be able to return the processed result to the drum during the next revolution. To obtain more time for data processing, it is only necessary to delay the input to flip-flop 154. A number of well known means for doing so are available such as inserting an electronic counter in line 162 (see legend in FIGURE 3) to count a predetermined number of fiducial pulses before permitting flip-flop 154 to be set to its "1" position.

To prevent interference from the processing of more than one entry simultaneously, the keyboard 22 is preferably locked until the tally operation is completed. This holds relay 136 closed to prevent re-charging of condenser 138 so that a "start" pulse cannot be applied to flip-flop 142. Such a safeguard is probably unnecessary in the specific embodiment being described but assumes major importance where several keyboards are being utilized.

Figure 4:
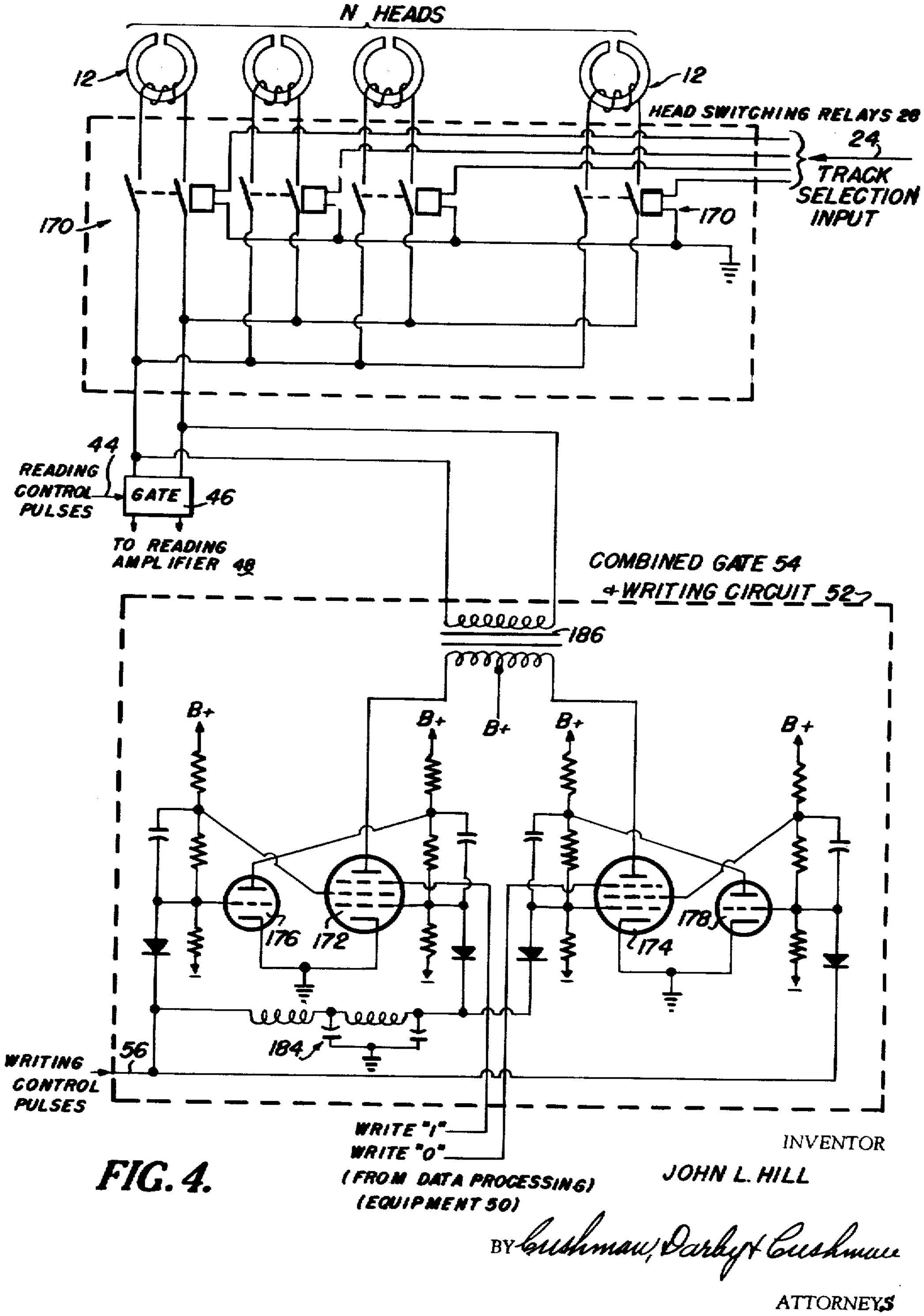
FIGURE 4 shows head switching means and a writing circuit suitable for use in FIGURE 1.

Referring now to FIGURE 4, a positive voltage on one of track selecting lines 24 closes the corresponding one of twelve relays, indicated generally as 170. This closes both leads to the read-write winding of the selected one of transducing heads 12. Preferably, both leads to each head are normally open as shown in FIGURE 4 in order to reduce cross-talk. The relays 170 are connected in common to reading amplifier 48 through gate 46 and to gate 54 and writing circuit 52. Both reading amplifier 48 and writing circuit 52 may take a number of well known forms. For instance, the reading amplifier disclosed in United States Patent No. 2,614,169 issued April 21, 1953, to A. A. Cohen, et al., could be used.

The writing circuit must be capable of selective alteration at relatively fast repetition rates. A combined circuit for gate 54 and writing circuit 52 which satisfies these requirements as shown in FIGURE 4. By merging these functions, a considerable saving in vacuum tubes and associated circuit elements is realized. Only four tubes are required, pentodes 172 and 174 and triodes 176 and 178, the triodes being preferably included in a single envelope. Upon examination of the circuit, it will be seen that the bottom three electrodes of pentode 172 combine with triode 176 to form a conventional, Eccles-Jordan type flip-flop. That is, the screen grid of pentode 172 and the anode of triode 176 are cross-connected to the control grids of the respective opposite tubes. A second flip-flop is identically formed by pentode 174 and triode 178. Negative writing-control pulses arriving on line 56 are applied to the grids of both triodes 176 and 178 so that they are cut off, if conducting, and the resultant rise in their plate potential triggers pentodes 172 and 174 so that they become conducting between their cathodes and screens. The suppressor grids of the pentodes are preferably driven from cathode followers in the data processing equipment 50 and so are normally held sufficiently negative to prevent the flow of current from reaching the plates. Each writing control pulse also passes through delay element 184 and is thereby delayed in the order of 1.5 microseconds. It is then impressed on the control grids of pentodes 172 and 174 to cut them off so that the triodes 176 and 178 again conduct current.

The data processing equipment 50 produces an output in the form of a positive voltage on one of two lines according to whether a "1" or "0" is to be written. This "write 1" voltage occurring coincidently with a writing control pulse on line 56 raises the potential of the suppressor of pentode 172 to a level sufficient to allow plate current as well as screen current when the tube conducts. The resultant output from transformer 186 writes a "1" on the track selected by relays 170. "Write 0" voltage is applied to the suppressor of pentode 174 so that a pulse of the opposite polarity is emitted from transformer 186, which pulse is sufficient to alter the state of magnetization of a cell on the drum to the "0" polarity.

The specific embodiment of this invention described above for modifying a non-consecutive set of 120 three-digit catalog numbers to a consecutive set of drum addresses may be readily expanded into a more practical system. For instance, it may be used to modify a random set of 120 blocks of ten consecutive catalog numbers into a consecutive set of 1200 numbers by adding one key to the keyboard and a sector track of 10 marks to the drum, which must be enlarged to contain 100 item records per track. The timing track must, of course, contain at least as many marks as the product, 100 times the maximum number of bits per tally. The output lines from the additional key are then directly wired for sector selection in a manner to be illustrated in the following example.

To retain a purely consecutive modification of a random set of numbers of any digit size, further switching means are required. In the embodiment of FIGURE 1, a single crossbar was used to modify the units digit by the two higher order digits. A second crossbar would allow modification by four higher order digits and a third crossbar, by six digits. To modify by an odd number of digits, a so-called "straight-bar" consisting of 10 sets of 11 contacts would be used in addition to one or more crossbars.

As an example, consider a six decimal digit catalog of 40,000 items. These items may be conveniently tallied on 400 tracks of a magnetic drum with each item stored in 1/100 of one track. If these items are numbered in a purely random pattern, provisions would have to be present for arbitrarily selecting 40,000 from the 1,000,000 possible candidates. An equipment-simplifying compromise may generally be introduced whereby the randomness applies to only 4,000 selections from the 100,000 combinations expressible by the highest order five digits. As a consequence, 4,000 selections then constitute the random number set, and for each of these a consecutive block of ten item numbers is allocated recording positions on the magnetic drum surface. For instance, the group of catalog items numbered 86943X, where X indicates any units digit from 0 to 9, may be assigned ten positions on one track. This simplifying compromise results in space being allocated to all ten items although fewer than ten may be desired. An example of how these ten catalog numbers and nine other such groups in the same numerical vicinity may be assigned addresses on the drum is:

| Catalog numbers: | Drum addresses |
|---|---|
| 86943X | 372–0–X |
| 86944X | 372–1–X |
| 86946X | 372–2–X |
| 86949X | 372–3–X |
| 86950X | 372–4–X |
| 86951X | 372–5–X |
| 86953X | 372–6–X |
| 86955X | 372–7–X |
| 86957X | 372–8–X |
| 86958X | 372–9–X |

Similarly to the example used in illustrating the embodiment of FIGURES 1–4, the three highest order digits of the drum address indicate track number; the next digit, the track tenth; and the X, a subsidiary tenth or track hundredth. Since the units digit of the catalog is not modified in the translation process, the values of X for the catalog number and the corresponding address are in every case identical, and recording space is thereby made available for all ten units-digit values.

Figure 5:
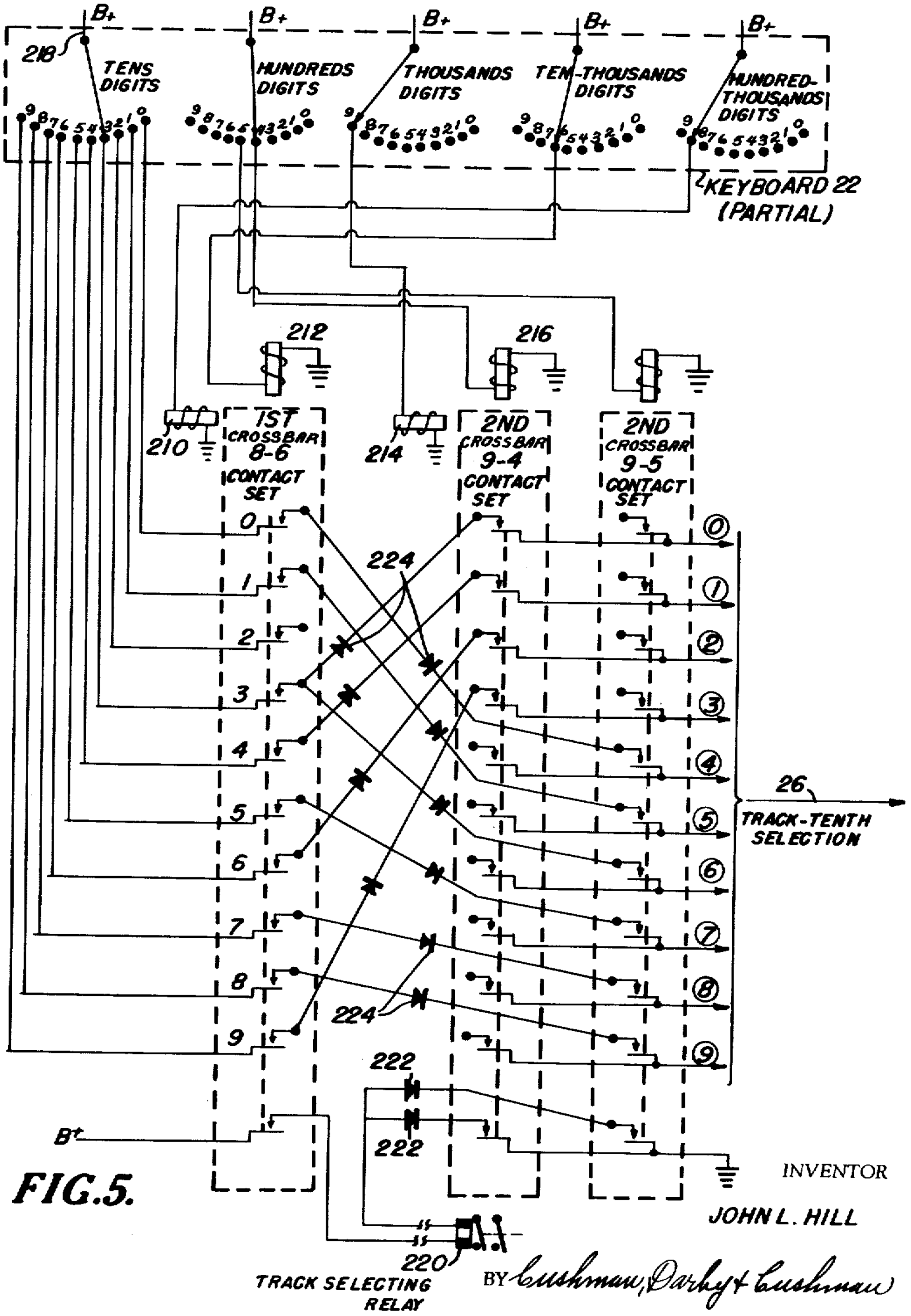
FIGURE 5 illustrates switching means for a further embodiment of the invention whereby a set of 4,000 randomly selected groups of ten consecutive numbers is transformed into a consecutive set of 40,000 numbers.

Reference is now made to FIGURE 5 to illustrate the manner in which two crossbars, each containing 100 sets of 11 contacts, may be interconnected so that the four highest order digits select a track and modify the fifth digit to make a tenth of track selection. Thus, for the given example of catalog number 86943X, the two coils 210 and 212 corresponding to the inputs "8" and "6" (hundred-thousands and ten-thousands digits) close the 8—6 contact set in the first crossbar which connects the ten wires carrying the value of the tens digit to the 9—4 contact set of the second crossbar and certain others whose presence is irrelevant. The "9" and "4" outputs from the thousands and hundreds digit keys in turn close the 9—4 contact set by means of coils 214 and 216. The combined action of the two contact sets thus allows the positive potential on line 218 to appear on the selected one of the track-tenth selecting lines 26, that is, the lead indicated by encircled numeral 0. Similarly, the action of other contacts of the two above named sets causes the tens-digit values of 4, 6 and 9 to appear on the encircled 1, 2 and 3 wires, respectively, of the track-tenth selecting lines 26. A similar action of the 8—6 and 9—5 contact sets of the first and second crossbars, respectively, causes the tens-digit values 0, 1, 3, 5, 7 and 8 to appear at terminals of the track-tenth selecting lines 26, respectively indicated by the encircled numerals 4, 5, 6, 7, 8 and 9.

The selection of the assigned track is accomplished by the 11th or bottom contact in the contact sets of the crossbar relays. In the example shown, the closure of contact sets 8—6 and 9—4 completes a circuit to the track selecting relay 220 which corresponds to one of track selecting relays 170 of FIGURE 4. It should be noted that the method of connecting the crossbar track selecting contacts to the track selecting relays used in FIGURES 2 and 4 is not applicable here since there are only 100 track selecting contacts on a single crossbar whereas there must be 400 unique track selections in the embodiment of this invention now under consideration. Also, rectifier elements 222 must here be included in the track selecting leads to guard against "sneak" currents, along with rectifier elements 224, in the same manner as diodes 74 were included in FIGURE 2, whereas such rectifier elements as 222 where not required in the track selecting leads of FIGURE 2. By this means the record for each catalog number is made in only one of the 400 tracks, and further, by a signal on one of lines 26, in only one of the ten sectors in the selected track with each binary digit in the tally occupying every tenth cell in the sector, this interlace selection being made by the unmodified units digit.

Figure 6A:
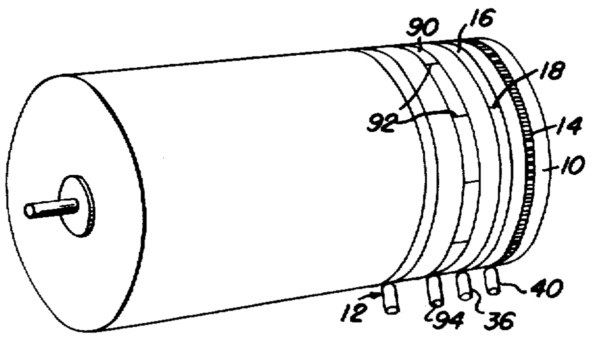
FIGURE 6A shows a modified drum having an additional control track.
Figure 6:
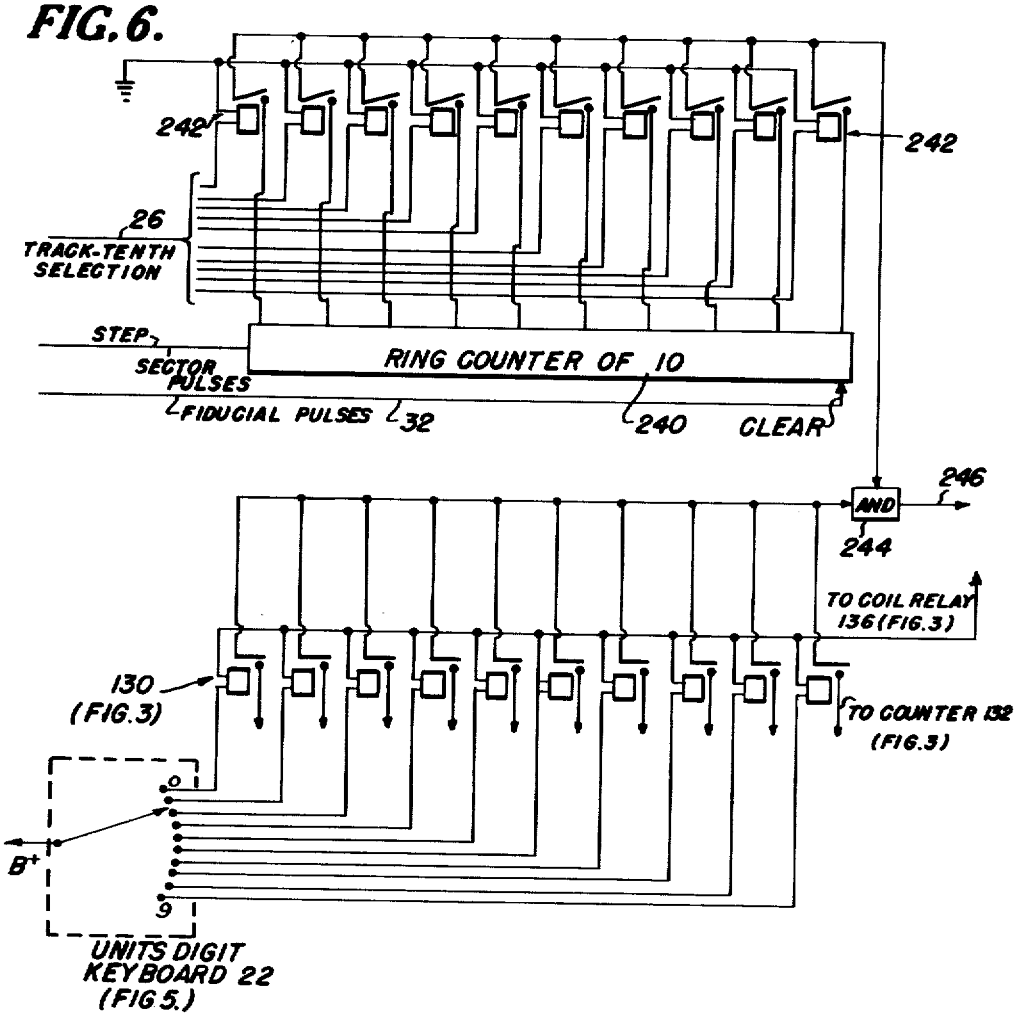
FIGURE 6 illustrates means for modifying the control unit of FIGURE 3 so that it may be employed in the embodiment of the invention presented by FIGURE 5.

A number of well known methods are available for making a sector selection, one of which will now be briefly described with reference to FIGURE 6. This method utilizes a third control track 90 on the magnetic drum, see FIGURE 6A, containing ten equally spaced sector marks 92 which are placed so that one of them produces a pulse in transducer 94 following the fiducial pulse by one timing pulse period. Pulses from the sector mark track are fed into a ring counter 240 which is cleared by the fiducial pulse. Each output line of the ring counter is connected to one of ten relay armatures, indicated generally as 242. The track-tenth selection lines 26 are wired to actuate one of the ten relays 242 to connect the selected output of the ring counter to a common lead, which lead may be fed into a "logical and" circuit 244 along with the recurring tenth timing pulse outputs of relays 130 of the control unit of FIGURE 3, which are now actuated by the unmodified units-digit values. The common lead from relays 242 in the circuit of FIGURE 6 may consequently be connected into line 134 of FIGURE 3 by "and" circuit 244 in FIGURE 6 to provide a modified control unit suitable for use in connection with the embodiment of this invention now being considered. It will be appreciated that an output will then be available on output line 246 (which corresponds to line 134 of FIGURE 3) at every tenth timing pulse only during the passage of the sector selected by the modified tens-digit line 26. Hence, each group of ten catalog numbers will be interlaced to fill one sector of the drum.

It should be pointed out here that the various electronic components indicated by boxes in FIGURES 1, 3, 4 and 6 are all of standard construction and well known to those skilled in the art. The "logical and" circuits and gates differ only in that the former produces an enable or voltage level output upon receipt of an enable voltage on both inputs whereas the two-input gate emits a pulse when a pulse is received on one input during the presence of an enabling voltage on the other. A suitable ring counter of 10 may be found at page 757 of Burks: Electronic Computing Circuits of the ENIAC, Proceedings of the I.R.E., Vol. 35.

Although, as hereinabove mentioned, this invention has been described in detail as an address locating technique for magnetic drums to provide an illustrative example, it need not be restricted either to magnetic recording or to data storage techniques. It is applicable to any situation in which it is desired to convert a random number set into a consecutive set of numbers. Therefore, it is intended that the matter contained in the foregoing description and the accompanying drawings be interpreted as illustrative and not in a limiting sense and the scope of the various aspects of the invention will be determined by the appended claims.

What is claimed is:

1. Apparatus for converting signals representing a number of a random number set wherein each number has at least three characters, the digit values of any of which can vary from 0 to N, N being a one digit number, to signals representing a number of a consecutive number set wherein each number has at least two characters, the apparatus comprising switch means including $(N+1)$ input lines, $(N+1)$ ouput lines, means for selectively energizing any one of the input lines thereby causing respective representation of the possible digit values of one character of a random number, means coupled to said switch means for causing signals based on the digit values of two other characters of said random number, a plurality of other output lines, and means in said switch means responsive to said signals to cause the energization on a selected input line to be switched to effect a signal on a predetermined one of said $(N+1)$ output lines and for concurrently causing another signal on one line of the said other output lines, the arrangement being such that a signal on one of said $(N+1)$ output lines is the result of the digit values of all three of said random number characters while the concurrent signal on one of said other output lines is a resultant non-related to the digit value of said one character but dependent on the digit values of both said two other characters, the two concurring output signals being indicative of a number in the consecutive number set which corresponds to the random number causing the concurring output signals.

2. Apparatus for converting signals representing a number of a random number set wherein each number has at least three digits the value of any of which can vary from 0 to N, N being a one digit number, to signals representing a number of a consecutive number set wherein each number has at least two characters, the apparatus comprising switch means having $(N+1)$ input lines and $(N+1)$ output lines, means for selectively energizing any one of said input lines thereby causing respective representation of the possible values of one digit of a random number, means coupled to said switch means for causing a different set of signals for different combinations of the values of at least two other digits of said random number, another input line continuously energized, a plurality of other output lines, and means in said switch means responsive to any set of said signals to cause the energization on a selectively energized input line to be switched to effect a first signal on a pre-designated one of said $(N+1)$ output lines and concurrently to cause the energization on said another input line to be switched to effect a second signal on a pre-designated one of said other output lines with said first and second signals appearing on different output line combinations in response to each different said set of signals, the arrangement being such that the one of the $(N+1)$ output lines on which said first signal occurs is the result of the instant values of all three of said random number digits while the one of the said other output lines on which said second signal occurs is a resultant non-related to the value of said one digit but dependent on the instant value of both said other digits, the two output lines carrying concurrent first and second signals being indicative of a number in the consecutive number set which corresponds to the random number causing the concurrent output signals.

3. Apparatus for converting at least three digits of any of a first group of numbers to two corresponding digits of a second group of numbers each of which has less digits than its corresponding first group number comprising two different sets of a plurality of output lines, a plurality of switch sets each of which have a plurality of switches, first, second, and third means each having a plurality of selectively energizable outputs respectively representing when energized the value of a different one of the three digits of said first group number, means coupled between said switch sets and the outputs of said second and third means for selectively operating a different switch set for each different energized combination of those outputs, means for coupling the outputs of said first means as inputs to said switch sets, means for coupling a continuously energized input other than any of the aforementioned inputs to said switch sets, and means interconnecting the switches of different switch sets between themselves and between all of said inputs and output lines in a predetermined manner for causing output signals on a different pair of output lines one from each of said sets for each different combination of energized outputs of the said first, second and third means.

4. Apparatus as in claim 3 wherein each number of said first group of numbers has at least four digits and is converted to three corresponding digits of a number in the second number group, and further including means having a plurality of selectively energizable outputs respectively representing when energized the value of the fourth digit of a first group number, and means coupled to each of the last mentioned outputs for generating a corresponding number of different time slots and causing a pulse in the one of those time slots which corresponds to an energized one of the last mentioned outputs.

5. Apparatus for converting at least five digits of any of a first group of numbers to two corresponding digits of a second group of numbers each of which has less digits than its corresponding first group number comprising two different sets of a plurality of output lines, first and second groups each having a plurality of switch sets with each set having a plurality of switches, first, second, third, fourth and fifth means each having a plurality of selectively energizable outputs respectively representing when energized the value of a different one of the five digits of said first group number, means coupled between the first group of said switch sets and the outputs of said fourth and fifth means for selectively operating a different first group switch set for each different energized combination of those outputs, means coupled between said second group of switch sets and the outputs of said second and third means for selectively operating a different switch set for each different energized combination of those outputs, means for coupling the outputs of said first means as inputs to the first group of switch sets, means for coupling a continuously energized input other than any of the aforementioned inputs to one of said group of switch sets, and means interconnecting the switches of different switch sets within each group and between groups and to all of said input and output lines in a predetermined manner for causing output signals on a different pair of output lines from each of said sets for each different combination of energized outputs of the first, second, third, fourth and fifth means.

6. Apparatus as in claim 5 wherein each number of said first group of numbers has a sixth digit which is converted to a third digit of a number in the second number group, and further including means having a plurality of selectively energizable outputs respectively representing when energized the value of the sixth digit of a number in said first group of numbers, and means coupled to the last mentioned outputs for effecting a corresponding plurality of different time slots and causing a pulse in only the time slot which corresponds to the one of the last mentioned outputs which is energized.

7. Apparatus as in claim 6 wherein the last mentioned means includes stepping means having its own plurality of output lines for causing a signal on its output lines successively, and switch means in each of the last mentioned output lines respectively energizable by an energized sixth digit output for passing the stepping means output signal.

8. Apparatus for converting a number of a random number set wherein each number has at least three characters, the digit values of any one of which can vary from 0 to N, N being a one digit number, to a number of a consecutive number set wherein each number has at least two characters, comprising a coordinate array of sets of $(N+2)$ switches arranged in $(N+1)$ rows in one coordinate direction and $(N+1)$ intersecting columns in another coordinate direction, $(N+1)$ means selectively energizable for selecting a respective one of said rows of switch sets, means settable to represent the instant digit value of one of the random number characters and coupled to the last mentioned means for selectively energizing same, $(N+1)$ means selectively energizable for selecting a respective one of said columns of switch sets, means settable to represent the instant digit value of a second one of said random number characters and coupled to the last mentioned means for selectively energizing same, the switches in a switch set at the intersection of a selected row and column being operated thereby, $(N+1)$ input lines, means settable to represent the instant digit value of a third one of said random number characters for correspondingly selectively energizing said input lines, $(N+1)$ output lines, means variously coupling said input and output lines together via certain of at most $(N+1)$ switches of each said set to cause the energization on a selected input line to effect a first signal at different times on different ones of said output lines ambiguously as to which one of the sets of switches is instantly operated, and means for resolving the ambiguity comprising a further input line continuously energized, a plurality of other output lines, and means variously coupling said further input and other output lines together via the $(N+2)$th switch in at least certain of said sets of switches to cause a second signal concurrent with the said first signal on the one of the said other output lines determined solely by the instantly operated set of switches, the arrangement being such that the one of the $(N+1)$ output lines on which any said first signal occurs is the result of the instant digit values of all three of said random number characters while the one of the said other output lines on which any said second signal occurs is a resultant nonrelated to the digit value of said third random number character but dependent on the instant digit value of each of the said one and second random number characters, different random numbers effecting said first and second signals on different output line combinations selected two at a time one from the said $(N+1)$ output lines and the other from the said other output lines, the instant output line combination carrying said first and second signals being indicative of a number in the consecutive number set corresponding to the instant random number causing those signals.

9. Apparatus for converting signals representating a number of a random number set wherein each number has at least two digits to signals representing a number of a consecutive number set wherein each number has at least two digits, the apparatus comprising a plurality of means interconnected in a predetermined manner and connectable to receive an input signal indicative of a given digit of a number from said random set for establishing on a predetermined number of a plurality of output lines signals representing said number of said consecutive number sets, and means for selecting at least one of said first mentioned means from said plurality thereof to cause said establishing of signals, said selecting means including energizing means controlled by input signals based upon at least the other digit of the number from said random set, the arrangement being such that the variation of said given digit is effectively modified by at least the value of said other digit, the input signal for the latter being operative to determine at least partially on which one of the output lines said given digit input signal is caused to be established, said output lines being divided into two groups, one line of the first group carrying a signal representing at least one digit of the consecutive number, and one line of the other group representing at least one other digit of the consecutive number.

10. Apparatus for converting signals representing a number of a random number set wherein each number has at least two digits to signals representing a number of a consecutive number set wherein each number has at least two digits, the apparatus comprising a plurality of means interconnected in a predetermined manner and connectable to receive an input signal indicative of a given digit of a number from said random set for establishing on a predetermined number of a plurality of output lines signals representing said number of said consecutive number set, and means for selecting at least one of said first mentioned means from said plurality thereof to cause said establishing of signals, said selecting means including energizing means controlled by input signals based upon at least the other digit of the number from said random set, the arrangement being such that the variation of said given digit is effectively modified by at least the value of said other digit, the input signal for the latter being operative to determine at least partially on which one of the output lines said given digit input signal is caused to be established, wherein each of the means for establishing signals on the output lines includes a contact set, the plurality of contact sets being arranged as a crossbar switch, each contact set having a plurality of simultaneously operable contacts, input lines for carrying signals respectively representing different values of said given digit of the random number, the said input lines being connected in a predetermined arrangement to contacts of the various contact sets, said energizing means being included in said crossbar switch and including first and second energizing means, each contact set having means operable by the first energizing means and the second energizing means so that but one contact set of the plurality thereof is operated at any one time, one of said first and second energizing means being controlled by a signal based upon said other digit of the random number and the other of the first and second energizing means being controlled by a signal based upon still another digit of the random number, wherein the output lines are divided into two groups, one line of the first group carrying a signal representing at least one digit of the consecutive number, and one line of the other group representing at least one other digit of the consecutive number.

11. Apparatus for converting signals representing a number of a random number set wherein each number has at least two digits to signals representing a number of a consecutive number set wherein each number has at least two digits, the apparatus comprising a plurality of means interconnected in a predetermined manner and connectable to receive an input signal indicative of a given digit of a number from said random set for establishing on a predetermined number of a plurality of output lines signals representing said number of said consecutive number set, and means for selecting at least one of said first mentioned means from said plurality thereof to cause said establishing of signals, said selecting means including energizing means controlled by input signals based upon at least the other digit of the number from said random set, the arrangement being such that the variation of said given digit is effectively modified by at least the value of said other digit, the input signal for the latter being operative to determine at least partially on which one of the output lines said given digit input signal is caused to be established, wherein each of the means for establishing signals on the output lines includes a contact set, the plurality of contact sets being arranged as a crossbar switch, each contact set having a plurality of simultaneously operable contacts, input lines for carrying signals representing the units digit of the random number, the said input lines being connected in a predetermined arrangement to contacts of the various contact sets, each contact set having means operable by a first energizing means and a second energizing means so that but one contact set of the plurality thereof is operated at any one time, one of said energizing means being controlled by a signal based upon the tens digit of the random number and the other of the energizing means being controlled by the hundreds digit of the random number, said output lines being divided into two groups, one line of the first group carrying a signal representing the units digit of the consecutive number, and one line of the other group representing jointly the tens and hundreds digit of the consecutive number.

12. Apparatus for converting signals representing a number of a random number set wherein each number has at least two digits to signals representing a number of a consecutive number set wherein each number has at least two digits, the apparatus comprising a plurality of means interconnected in a predetermined manner and connectable to receive an input signal indicative of a given digit of a number from said random set for establishing on a predetermined number of a plurality of output lines signals representing said number of said consecutive number set, and means for selecting at least one of said first mentioned means from said plurality thereof to cause said establishing of signals, said selecting means including energizing means controlled by input signals based upon at least the other digit of the number from said random set, the arrangement being such that the variation of said given digit is effectively modified by at least the value of said other digit, the input signal for the latter being operative to determine at least partially on which one of the output lines said given digit input signal is caused to be established, wherein the plurality of means for establishing signals on the output lines includes at least two groups of such plurality of means, and wherein one digit of the random number in combination with said other digit of the random number controls one group of said plurality of means, and wherein digits of two other orders of the random number control the second group of said means, the apparatus further including selectively connectable means between the first and second groups whereby said given digit of the random number may be modified by all said other digits of the random number, said output lines being divided into two groups, one line of the first group carrying a signal representing at least one digit of the consecutive number, and one line of the other group representing at least one other digit of the consecutive number.

References Cited in the file of this patent

UNITED STATES PATENTS

| | | |
|---|---|---|
| 2,139,079 | Haselton | Dec. 6, 1938 |
| 2,147,656 | Krum et al. | Feb. 21, 1939 |
| 2,265,844 | Korn | Dec. 9, 1941 |
| 2,358,095 | Parker | Sept. 12, 1944 |
| 2,369,474 | Luhn | Feb. 13, 1945 |
| 2,492,240 | Rudolph | Dec. 27, 1949 |
| 2,549,071 | Dusek | Apr. 17, 1951 |
| 2,587,532 | Schmidt | Feb. 26, 1952 |
| 2,615,972 | Hubbard | Oct. 28, 1952 |
| 2,617,704 | Mallina | Nov. 11, 1952 |
| 2,625,601 | Halvorsen | Jan. 13, 1953 |
| 2,633,498 | Schneckloth | Mar. 31, 1953 |
| 2,639,331 | Ostline | May 19, 1953 |
| 2,674,733 | Robbins | Apr. 6, 1954 |
| 2,721,990 | McNaney | Oct. 25, 1955 |
| 2,771,595 | Hendrickson | Nov. 20, 1956 |
| 2,798,119 | Graybill | July 2, 1957 |
| 2,805,283 | Stiles | Sept. 3, 1957 |
| 2,832,064 | Lubkin | Apr. 22, 1958 |